(12) United States Patent
Sheaffer et al.

(10) Patent No.: US 12,149,919 B2
(45) Date of Patent: Nov. 19, 2024

(54) AUTOMATIC ACOUSTIC HANDOFF

(71) Applicant: Apple Inc., Cupertino, CA (US)

(72) Inventors: Jonathan D. Sheaffer, San Jose, CA (US); Martin E. Johnson, Los Gatos, CA (US); Andrew P. Bright, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 17/677,808

(22) Filed: Feb. 22, 2022

(65) Prior Publication Data

US 2022/0279305 A1 Sep. 1, 2022

Related U.S. Application Data

(60) Provisional application No. 63/154,651, filed on Feb. 26, 2021.

(51) Int. Cl.
| | |
|---|---|
| *H04S 7/00* | (2006.01) |
| *G10L 25/21* | (2013.01) |
| *G10L 25/60* | (2013.01) |
| *H04R 1/10* | (2006.01) |
| *H04R 1/40* | (2006.01) |
| *H04R 3/00* | (2006.01) |
| *H04R 5/033* | (2006.01) |

(Continued)

(52) U.S. Cl.
CPC .............. *H04S 7/304* (2013.01); *G10L 25/21* (2013.01); *G10L 25/60* (2013.01); *H04R 1/1016* (2013.01); *H04R 1/1041* (2013.01); *H04R 1/406* (2013.01); *H04R 3/005* (2013.01); *H04R 5/033* (2013.01); *H04R 5/04* (2013.01); *H04S 2400/11* (2013.01); *H04S 2400/15* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 8,600,436 B2 * | 12/2013 | Haartsen ............... | H04W 72/02 455/501 |
| 10,999,088 B2 * | 5/2021 | Iyer ..................... | H04L 12/1822 |

(Continued)

OTHER PUBLICATIONS

Unpublished U.S. Appl. No. 17/483,741, filed Sep. 23, 2021, 282 pages.

*Primary Examiner* — Paul W Huber
(74) *Attorney, Agent, or Firm* — Aikin & Gallant, LLP

(57) ABSTRACT

Disclosed are systems and methods for automatically transitioning between communication modes of wearable audio output devices based solely on acoustic analysis. The audio output devices may operate in one of three electroacoustic modes. In the transparency mode, an audio output device may pass through the speech signal of a nearby user. In the peer-to-peer mode, the audio output device may establish a direct low-latency radio frequency (RF) link to another audio output device. In the telephony mode, the audio output device may communicate with another audio output device using networked telephony. The disclosed methods and systems perform acoustic analysis of the near-field speech signal of a local wearer of the audio output device and the far-field speech signal of a remote talker to determine the best mode for the audio output device to use and to seamlessly transition between the modes as the acoustic environment between the wearers changes.

16 Claims, 8 Drawing Sheets

(51) Int. Cl.
*H04R 5/04* (2006.01)
*H04W 76/14* (2018.01)

(56) References Cited

U.S. PATENT DOCUMENTS

| 11,150,866 B2* | 10/2021 | Rand ........................ G10L 15/08 |
| 11,315,555 B2* | 4/2022 | Su ............................ G10L 15/08 |
| 2016/0214015 A1 | 7/2016 | Osman et al. |

* cited by examiner

AUTOMATIC ACOUSTIC HANDOFF

CROSS REFERENCE TO RELATED APPLICATIONS

This application claims the benefit of U.S. Provisional Application No. 63/154,651 filed on Feb. 26, 2021, the disclosure of which is incorporated herein by reference in its entirety.

FIELD

This disclosure relates to the field of audio communication, including, to digital signal processing methods designed to automatically identify and transition between various modes of electroacoustic communication adapting to changing acoustic environments. Other aspects are also described.

BACKGROUND

Audio output devices, including wearable audio output devices such as headphones, earbuds, earphones, etc., are widely used to provide audio output to users using various electroacoustic communication modes. A wearable audio output device may be paired to a phone in a telephony mode or operate in a transparency mode that allows a user to hear the ambient sound through the audio output device, facilitating communication with a nearby speaker without needing to remove the audio output device.

SUMMARY

Disclosed are aspects of methods and systems for automatically transitioning between communication modes of wearable audio output devices based solely on acoustic analysis. The audio output devices may operate in one of three electroacoustic modes when worn by users communicating using the audio output devices. In the transparency mode, an audio output device may pass through the speech signal of a nearby user. In the peer-to-peer mode, the audio output device may establish a direct low-latency radio frequency (RF) link to another audio output device within a communication range of the RF link. In the telephony mode, the audio output device may communicate with another audio output device using networked telephony. The disclosed methods and systems perform acoustic analysis of the near-field speech signal of a local wearer of the audio output device and the far-field speech signal of a remote talker to determine the best mode for the audio output device and to seamlessly transition between the modes as the acoustic environment between the local wearer of the audio output device and the remote talker changes.

In one aspect, the method may process the near-field and far-field speech signals captured by one or more microphones of the audio output device to estimate parameters of the acoustic environment. In one aspect, the audio output device of the local wearer and the audio output device of the remote talker may estimate the acoustic parameters of the environment reciprocally. The two audio output devices may each estimate the acoustic parameters and their rate of change based on their respective near-field and far-field speech signals. The two audio output devices may exchange the estimated acoustic parameters, for example through the direct RF link of the peer-to-peer mode to increase the confidence of the estimated acoustic parameters. In effect, the two audio output devices may act as a distributed, non-phase locked, microphone array to perform the reciprocal estimation of the acoustic parameters to determine the electroacoustic mode to use for communicating between the two wearers of the audio output devices. In one aspect, only one audio output device may estimate the acoustic parameters and their rate of change if the other audio output device does not have the processing capability, has processing constraints, or wants to save power.

The method may process the estimated acoustic parameters to determine whether it is possible to allow the wearers of the audio output devices to engage in communication in the transparency mode, such as when the wearers are within an audible range of each other to carry on a face-to-face conversation. The method may further process the estimated acoustic parameters to generate spatialization metadata of the remote talker. In one aspect, when the far-field speech signal is too attenuated, such as when the distance between the two wearers exceeds an audible communication range, the audio output device of the local wearer may establish a direct low-latency RF link in the peer-to-peer mode with the audio output device of the remote talker to receive the far-field speech signal electromagnetically. The method may use the spatialization metadata to re-spatialize the far-field speech signal received through the direct RF link to have a level and a perceived direction of arrival that mimic spatially the remote talker. The spatialized far-field speech signal from the direct RF link may be used to augment the far-field speech signal received acoustically by the microphones. In one aspect, the method may add the far-field speech signal received acoustically by the microphones with the spatialized far-field speech signal from the RF link to improve the signal-to-noise ratio (SNR) of the far-field speech signal. In one aspect, the audio output device of the local wearer may output the augmented far-field speech signal to the user via a speaker of the audio output device in the peer-to-peer mode.

The method may estimate the power spectrum of the acoustic far-field speech signal, the spatialized far-field speech signal, or the augmented far-field speech signal such as by generating a running power spectrum density (PSD) estimate of the far-field speech signals in the transparency mode or the peer-to-peer mode. In one aspect, the method may process the estimated acoustic parameters to determine that the distance between the two talkers exceeds the communication range of the direct RF link. The audio output device of the local wearer may switch from the peer-to-peer mode to the telephony mode to receive the far-field speech signal from the audio output device of the remote talker through networked telephony. The method may equalize the far-field speech signal received through the telephony mode with the running power spectrum density estimate to smooth the transition from the peer-to-peer mode to the telephony mode. In one aspect, the method may sum the equalized far-field speech signal in the telephony mode with the spatialized far-field speech signal or the augmented far-field speech signal in the peer-to-peer mode. In one aspect, the method may estimate the power spectrum of the acoustic near-field signal by generating a running PSD estimate of the near-field speech signal in the transparency mode or in the peer-to-peer mode. The method may process the estimated acoustic parameters, the PSD estimates of the far-field speech signals, and the PSD estimates of the near-field speech signals to estimate the distance between the two talkers and to switch among the transparency mode, the peer-to-peer mode, and the telephony mode. In one aspect, if one of the audio output devices does not have the capability for the direct link RF of the peer-to-peer mode, the method may switch the directly between the transparency mode and the telephony mode.

In one aspect, a method of communicating between a local talker wearing a local earphone and a remote talker wearing a remote earphone is disclosed. The method processes the near-field speech signal of the local talker and the far-field speech signal of the remote talker received by the local earphone to estimate acoustic parameters. The method also processes the estimated acoustic parameters to determine a communication mode between the local earphone and the remote earphone. The communication mode includes an acoustic transparency mode, a peer-to-peer RF mode, or a telephony mode. If the communication mode is determined to be in the peer-to-peer mode, the method processes the far-field speech signal received through the peer-to-peer mode to generate a spatialized speech signal. If the communication mode is determined to be the telephony mode, the method processes the far-field speech signal received through the telephony mode to generate a telephony speech signal. The method outputs to a speaker of the local earphone the far-field speech signal received through the acoustic transparency mode, the spatialized speech signal in the peer-to-peer mode, or the telephony speech signal in the telephony mode.

In one aspect, a method of communicating between a local talker wearing a local earphone and a remote talker wearing a remote earphone is disclosed. The method processes the near-field speech signal of the local talker and the far-field speech signal of the remote talker to estimate acoustic parameters. The far-field speech signal is captured as an acoustic signal using a microphone of the local earphone. The method processes the estimated acoustic parameters to determine whether to augment the acoustic signal with an RF transmission received by the local earphone from the remote earphone. The RF transmission is used to carry the far-field speech signal electromagnetically. If it is determined to augment the acoustic signal, the method processes the acoustic signal and the far-field speech signal received on the RF transmission to generate an augmented acoustic signal. The method outputs the augmented acoustic signal or the acoustic signal when it is not augmented to a speaker of the local earphone.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
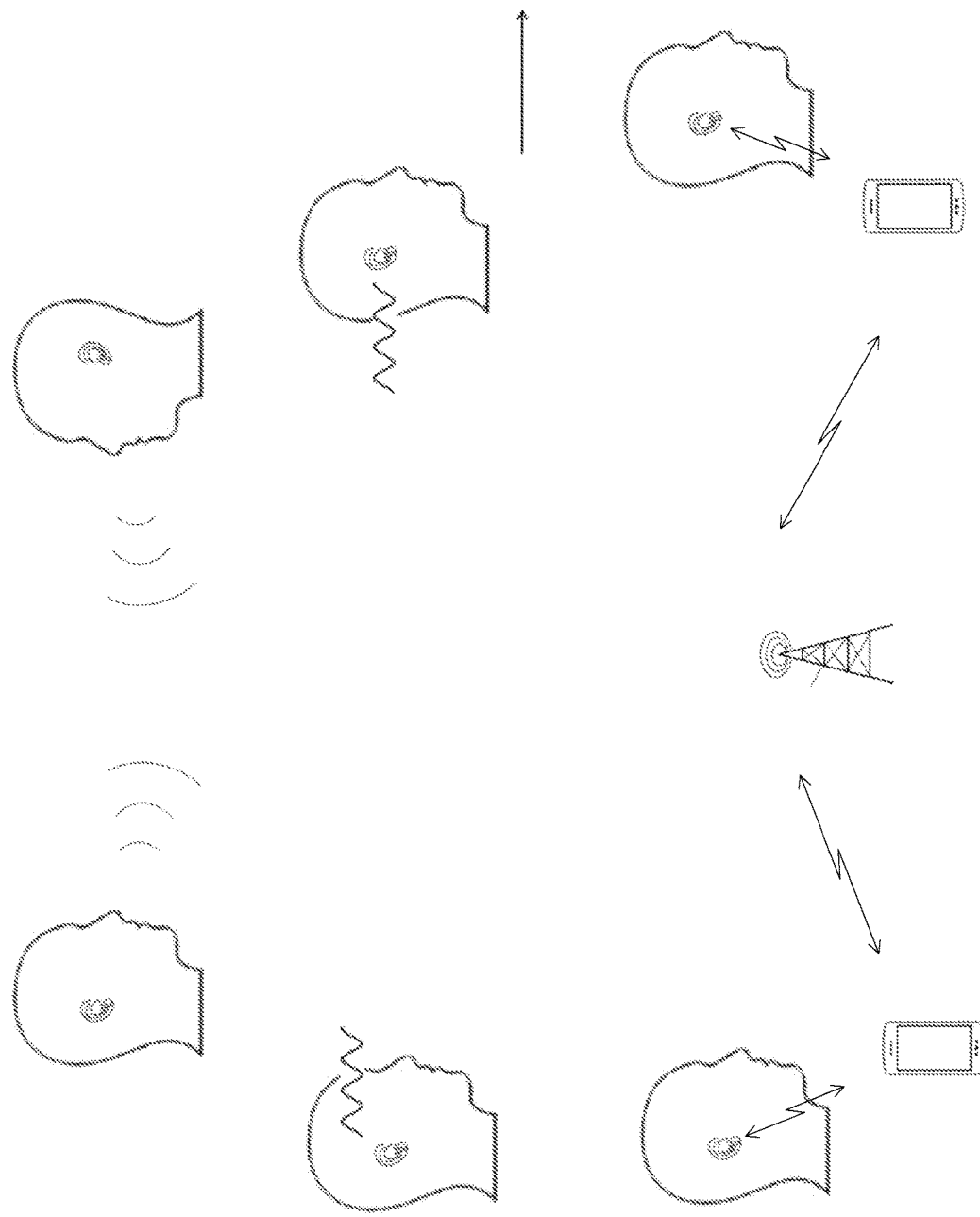
FIG. 1 depicts two wearers of audio output devices communicating with one another using a transparency mode, a peer-to-peer mode, or a telephony mode of the audio output devices according to one aspect of the disclosure.

A wearable audio output device may operate in a transparency mode that allows a user to hear the ambient sound without requiring the user to remove the audio output device. In some scenarios, the ambient sound including the speech of a nearby speaker perceived by the user may be attenuated due to the physical obstruction presented by the audio output device. In one mode, the audio output device may pass through the attenuated ambient sound to the user's ear or alternatively may amplify the ambient sound by capturing the ambient sound using a microphone and playing the captured acoustic signal.

In another mode, when the audio output device is paired to a phone, the audio output device may actively cancel the ambient sound to allow the user to make traditional phone calls. The two modes of communication are conventionally treated in isolation. When a user wishes to switch between the modes, the user may have to do so manually. For example, when a user wishes to interrupt a conversation with a nearby speaker in the transparency mode to make a phone call, the user may have to turn off the transparency mode to place the phone call. After the phone call, the user may have to reactivate the transparency mode to continue the conversation with the nearby speaker.

In another scenario, the user may wish to carry on the conversation with the nearby speaker even when either the user or the nearby speaker strays outside of the audible range of the conversation. When the speech signal from the nearby speaker becomes too attenuated to be audible due to the increased distance, the user may have to manually switch off the transparency mode to place a call to the speaker, potentially interrupting the conversation. As such, requiring the user to manually switch between the operating modes of the wearable audio output device may be inconvenient and may diminish the overall audio experience of the user.

It is desirable to automatically transition between communication modes of wearable audio output devices based solely on acoustic analysis without requiring manual user intervention or commands. For example, when two wearers of headphones, earbuds, earphones, etc., are conversing face-to-face in close proximity, each audio output device may operate in a transparency mode to capture the speech signal from the other speaker acoustically using a microphone array that preserves the spatial characteristics of the speech signal. Each audio output device may process the acoustic signal captured by the microphone array to extract acoustic parameters and their rate of change to determine if it's feasible to continue the conversation in the transparency mode as the distance between the two speakers or the acoustic environment changes. In one aspect, the acoustic parameters may include the level difference between the far-field speech of the remote talker and the near-field speech of the local talker, direct-to-reverberant ratio of the far-field speech signal, a measure of the energy distribution of the far-field speech signal, Lombard effect or the change in the level of the near-field speech signal, direction of arrival of the far-field speech signal, a measure of intelligibility of the far-field speech signal, etc.

The audio output device may process the extracted acoustic parameters to determine that continuing the conversation using the transparency mode may no longer be feasible due to increasing distance between the talkers or due to a noise source. The audio output device may augment the acoustic signal in the transparency mode by receiving the far-field speech signal electromagnetically through a direct low-latency RF link by switching the two devices to operate in the peer-to-peer mode. The audio output device may estimate the required level and direction for re-spatializing the far-field speech signal received through the RF link based on the extracted acoustic parameters. The audio output device may re-spatialize the far-field speech signal received through the RF link such that it is coherent with the spatial position of the remote speaker so that the acoustic signal may be augmented in a seamless manner. In one aspect, the audio device may add the far-field speech signal received acoustically through the microphones with the spatialized far-field speech signal received through the RF link to improve the SNR of the far-field speech in the augmented signal.

In one aspect, when the audio output device determines that the RF link is exceeding its operating range, the audio output device may switch to operate in the telephony mode with the other audio output device. The audio output device may equalize the far-field speech signal carried by the telephony signal to have a similar power spectrum as the spatialized far-field speech signal. In one aspect, the audio output device may estimate the running statistics of the power spectrum density (PSD) of the spatialized far-field speech signal in the transparency mode or in the peer-to-peer mode. The audio output device may equalize the far-field speech signal carried by the telephony signal using the running PSD estimate to smooth the transition to the telephony mode. The raw acoustic signal in the transparency mode, the augmented far-field speech signal in the peer-to-peer mode, or the equalized far-field speech signal in the telephony mode may be output to the user through a speaker of the audio output device. In one aspect, the audio output device may estimate the PSD of the near-field speech signal in the transparency mode or in the peer-to-peer mode. The method may compare the PSD estimates of the far-field speech signals and the PSD estimates of the near-field speech signals or their relative rates of change to estimate the distance between the two talkers or changes in the acoustic environment. The audio output device may use the information to determine when to switch among the transparency mode, the peer-to-peer mode, and the telephony mode.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the elements or features in use or operation in addition to the orientation depicted in the figures. For example, if a device containing multiple elements in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 depicts two wearers of audio output devices communicating with one another using a transparency mode, a peer-to-peer mode, or a telephony mode of the audio output devices according to one aspect of the disclosure. To simplify the description, the wearer of the audio output device receiving speech signals from the other talker is referred to as the local talker. The audio output device worn by the local talker is referred to as the local audio output device. The signal representing the speech of the local talker is referred to as the near-field speech signal. Conversely, the other talker is referred to as the remote talker, the audio output device worn by the remote talker is referred to as the remote audio output device, and the signal representing the speech of the remote talker is referred to as the far-field speech signal.

In a sub-mode of the transparency mode, the local audio output device may output one or more audio components such as the ambient sound including the far-field speech signal of the remote talker. The local audio output device may capture the far-field speech signal using one or more microphones facing the surrounding acoustic environment. The local audio output device may amplify and play the captured far-field speech signal to the local talker through a speaker of the local audio output device. In this sub-mode of the transparency mode involving active sound reproduction, the local talker may hear a greater amount of the ambient sound from the surrounding physical environment than would otherwise be audible with the passive attenuation of the ambient sound due to the physical obstruction of the local audio output device in the local talker's ear. In one aspect, if the two talkers are sufficiently close, the local audio output device may turn off the active sound reproduction so that any amount of ambient sound that the local talker perceives is due to passive attenuation by the local audio output device. This passive acoustic leakage sub-mode of the transparency mode may be referred to as the pass-through sub-mode or the "off" sub-mode. Aspects of the disclosure pertaining to the transparency mode may apply to the active-sound-reproduction sub-mode or the pass-through sub-mode of the transparency mode, or any other mode that allows the local talker to hear the natural world through the local audio output device. Similarly, references to captured acoustic signal in the transparency mode may refer to the amplified signal or the passive leakage signal captured by the microphones without active amplification.

Figure 2:
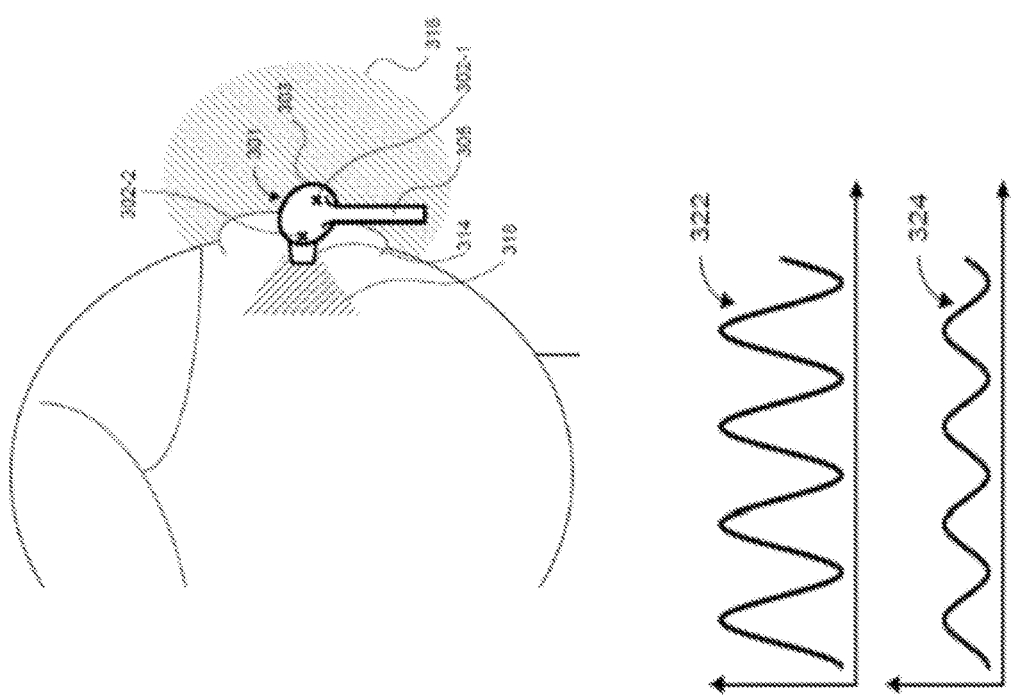
FIG. 2 depicts a wearable audio output device and the perceived ambient sound according to one aspect of the disclosure.

FIG. 2 depicts a wearable audio output device and the perceived ambient sound according to one aspect of the disclosure. The wearable audio output device 301 includes the earbud 303, stem 305, and the ear-tip 314. The wearable audio output device 301 is worn by a user such that earbud 303 and ear-tip 314 are in the user's left ear. Ear-tip 314 extends at least partially in the user's ear canal. In one use case, when earbud 303 and ear-tip 314 are inserted into the user's ear, a seal may be formed between ear-tip 314 and the user's ear so as to isolate the user's ear canal from the surrounding physical environment. In other use cases, earbud 303 and ear-tip 314 together block some, but not necessarily all, of the ambient sound in the surrounding physical environment from reaching the user's ear.

A first microphone or a first array of microphones 302-1 is located on wearable audio output device 301 to capture the ambient sound, represented by waveform 322 in region 316 of a physical environment surrounding the user. A second microphone or a second array of microphones 302-2 is located on wearable audio output device 301 to capture any ambient sound, represented by waveform 324, that is not completely blocked by earbud 303 and ear-tip 314 and that can be heard in region 318 inside the user's ear canal. In one aspect, the second microphone 302-2 may be used to capture the near-field speech signal of the user.

Referring back to FIG. 1, if the remote talker walks away from the local talker, the far-field speech signal is attenuated as a function of the distance between the two talkers. The local audio output device may analyze the far-field speech signal and the near-field speech signal to estimate acoustic parameters of the local environment and the rate of change of the estimated acoustic parameters. In one aspect, the local audio output device and the remote audio output device may each estimate the acoustic parameters of their respective environments and their rate of change based on their respective near-field and far-field speech signals. The two audio output devices may exchange the estimated acoustic parameters, for example through the direct RF link of the peer-to-peer mode, to increase the confidence of the estimated acoustic parameters. For example, the local audio output device may analyze the acoustic parameters received from the remote audio output device, where the acoustic parameters are estimated by the remote audio output device based on the near-field speech signal of the local talker received acoustically by the remote audio output device. The local audio output device may reciprocally estimate the acoustic parameters associated with the far-field speech signal of the remote talker received acoustically by the local audio output device. In effect, the two audio output devices may act as a distributed, non-phase locked, microphone array to perform reciprocal estimation of the acoustic parameters. In one aspect, only one of the two audio output devices may estimate the acoustic parameters and their rate of change if the other audio output device does not have the processing capability, has processing constraints, or wants to save power. The audio output device that estimates the acoustic parameters may transmit the estimated acoustic parameters to the other audio output device through the RF link.

The local audio output device may analyze the estimated acoustic parameters to determine whether it is possible to continue the conversation in the transparency mode. If the analysis of the acoustic parameters indicates that the far-field speech signal is sufficiently attenuated such that it may not be intelligible, the local audio output device may establish a direct low-latency RF link in the peer-to-peer mode with the remote audio output device to receive the far-field speech signal electromagnetically through the direct RF link. To enable a smooth transition, the local audio output device may process the estimated acoustic parameters to generate spatialization metadata of the remote talker.

The local audio output device may use the spatialization metadata to re-spatialize the far-field speech signal received through the direct RF link to have a level and a perceived direction of arrival that mimic spatially the remote talker. The spatialized far-field speech signal from the direct RF link may be used to augment the far-field speech signal received acoustically by the microphones in the transparency mode. In one aspect, the local audio output device may time-align the far-field speech signal from the microphones with the spatialized far-field speech signal from the direct RF link to generate the augmented far-field speech signal. In one aspect, the local audio device may add the far-field speech signal received from the microphones with the spatialized far-field speech signal from the RF link to improve the SNR of the augmented far-field speech. In one aspect, the local audio output device may switch to the peer-to-peer mode to output the spatialized far-field speech signal to the speaker of the local audio output device without augmenting the acoustic far-field speech signal of the transparency mode.

If the remote talker walks further away from the local talker, the local audio output device may analyze the estimated acoustic parameters to determine that the direct RF link is exceeding its operating range. The local audio output device may switch to operate in the telephony mode with the remote audio output device. The local audio output device may equalize the far-field speech signal received through the telephony signal to have a similar power spectrum as the spatialized far-field speech signal. In one aspect, the local audio output device may estimate the running statistics of the power spectrum density (PSD) of the spatialized far-field speech signal in the transparency mode or in the peer-to-peer mode. The local audio output device may equalize the far-field speech signal received through the telephony signal using the running PSD estimate to smooth the transition to the telephony mode. The local audio output device may output the equalized far-field speech signal to the speaker of the local audio output device in the telephony mode. In one aspect, if remote talker does not wear an audio output device or the remote audio output device does not have the capability for the direct link RF of the peer-to-peer mode, the local audio output device may switch directly between the transparency mode and the telephony mode. For example, the local audio output device may analyze the estimated acoustic parameters in the transparency mode to determine that the far-field speech signal received acoustically from the microphones is sufficiently attenuated such that the communication mode should be switched from the transparency mode to the telephony mode.

Figure 3:
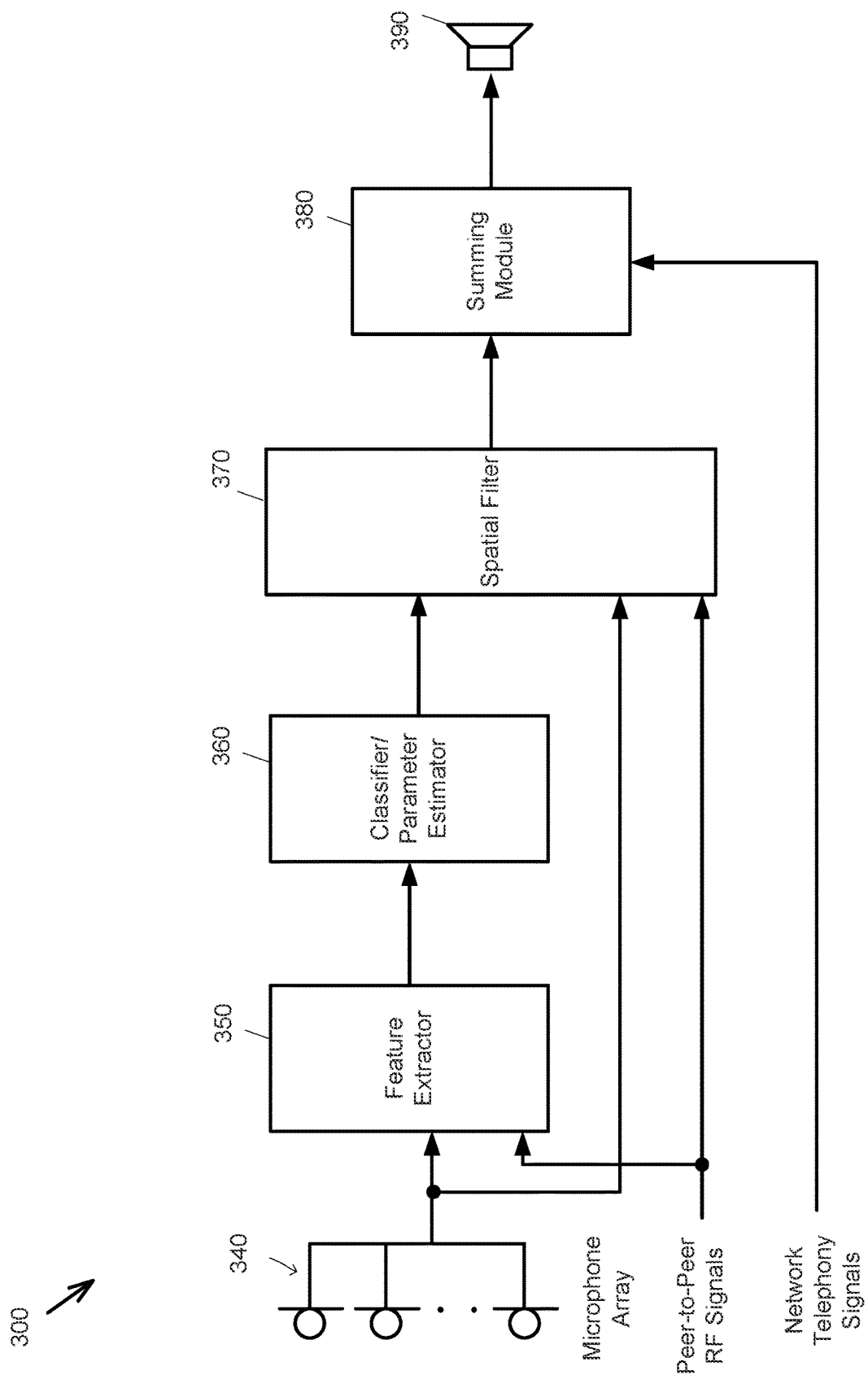
FIG. 3 depicts a functional block diagram of a system that processes ambient sound including speech signals captured acoustically by a microphone array of a local wearable audio output device and speech signals received electromagnetically from a remote wearable audio output device to determine a communication mode between the audio output devices based solely on acoustic analysis and to transition between the communication modes according to one aspect of the disclosure.

FIG. 3 depicts a functional block diagram of a system 300 that processes ambient sound including speech signals captured acoustically by a microphone array of a local wearable audio output device and speech signals received electromagnetically from a remote wearable audio output device to determine a communication mode between the audio output devices based solely on acoustic analysis and to transition between the communication modes according to one aspect of the disclosure. The system 300 may be located in the local audio output device or in a mobile device paired with the local audio output device.

The microphone array 340 may include the first microphone/microphone array 302-1 and the second microphone/microphone array 302-2 of the wearable audio output device 301 depicted in FIG. 2. The microphone array 340 may capture the far-field speech signal of the remote talker and the near-field speech signal of the local talker. In one aspect, the microphones of the microphone array 340 may have directional sensitivity to enable the system 300 to estimate the direction of arrival of the far-field speech signal.

A feature extractor module 350 may process the acoustic signals of the far-field speech signal and the near-field speech signal to estimate parameters of the acoustic environment and the rate of change of the acoustic parameters. In one aspect, the feature extract module 350 may receive acoustic parameters estimated by the remote audio output device. The local and remote audio output devices may exchange the estimated acoustic parameters through the direct RF link of the peer-to-peer mode to increase the confidence of the estimated acoustic parameters. In one aspect, the local audio output device may use the acoustic parameters estimated by the remote audio output device to estimate its reciprocal acoustic parameters. For example, the estimated acoustic parameters received from the remote audio output device may indicate that the far-field speech signal from the local talker is received by the remote audio output device with a certain direction of arrival at a certain speech level and that the near-field speech signal of the remote talker is captured by the remote audio output device at another level. Based on the reciprocal relationship between the two audio output devices, the feature extract module 350 may use this information and information on the estimated speech level of the near-end speech signal of the local talker to estimate the direction of arrival and the speech level of the far-field speech signal of the remote talker. In one aspect, the local audio output device may estimate the acoustic parameters unaided by the remote audio output device and then use the acoustic parameters estimated by the remote audio output device to verify or refine the acoustic parameters estimated by the local audio output device.

Figure 4:
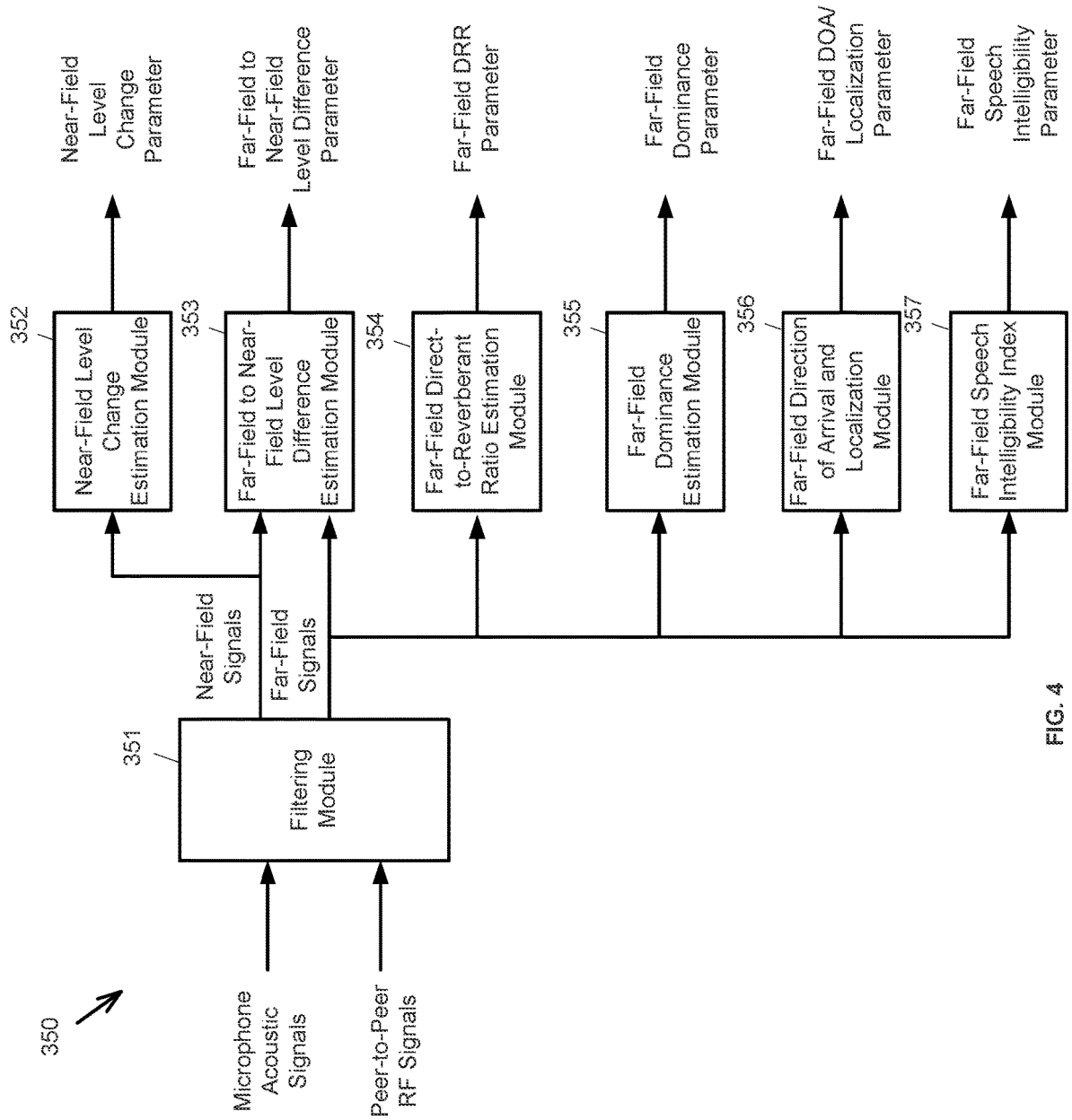
FIG. 4 depicts a functional block diagram of a feature extractor module that processes the near-field speech and far-field speech signals to estimate parameters of the acoustic environment used to determine the communication mode of a wearable audio output device according to one aspect of the disclosure.

FIG. 4 depicts a functional block diagram of the feature extractor module 350 that processes the near-field speech and far-field speech signals to estimate parameters of the acoustic environment used to determine the communication mode of the local audio output device according to one aspect of the disclosure.

A filtering module 351 may filter the acoustic signals captured by the microphone array 340 to detect the far-field speech signal and the near-field speech signal. For example, the filtering module 351 may filter the acoustic signals captured by the first microphone/microphone array 302-1 and the second microphone/microphone array 302-2 of the wearable audio output device 301 depicted in FIG. 2 to detect the far-field speech signal and the near-field speech signal, respectively. In one aspect, the filtering module 351 may filter the signal received through the direct RF link of the peer-to-peer mode to detect the far field speech signal or the acoustic parameters estimated by the remote audio output device. Various module may process the far-field and near-field speech signals to estimate various acoustic parameters.

For example, a near-field level change estimation module 352 may process the near-field speech signal to estimate the change in the level of the near-field speech signal over time. For example, the near-field level change estimation module 352 may measure the Lombard effect, which is the involuntary tendency of the local talker to increase the vocal effect to enhance the audibility of the voice when speaking in loud noise or when the distance to the remote talker increases. Such vocal effects may include increased loudness, higher pitch, slower rate, or longer duration of syllables, etc.

A far-field to near-field level difference estimation module 353 may process the near-field and far-field speech signals to estimate the difference in the level or volume between the near-field and far-field speech signals and the change in the level difference. For example, when the remote talker is far from the local talker, the level difference between the near-field and far-field speech signals may be large. In one aspect, the far-field to near-field level difference estimation module 353 may estimate the PSD of the near-field and far-field speech signals. The PSD of the near-field and far-field speech signals may be compared or their relative rates of change may be analyzed to estimate the distance between the local and remote talkers or to estimate changes in the acoustic environment.

A far-field direct-to-reverberant ratio (DRR) estimation module 354 may process the far-field speech signal to estimate the DRR of the far-field speech signal and the change in the DRR. In one aspect, a voice activity detector and a near-field/far-field classifier may detect the far-field speech signal and may estimate the direct component and the reverberant component of the far-field speech signal to estimate the DRR. In one aspect, the voice activity detector and the near-field/far-field classifier may apply a machine learning approach such as using a convolutional neural network (CNN), a recursive neural network (RNN), etc. In one aspect, a voice activity detector may detect speech on the near-field speech signal. The local audio output device may transmit a signal to the remote audio output device indicating the detection of speech of the local talker to enable the remote audio output device to estimate the acoustic parameters of the speech signal received from the local talker. Reciprocally, the feature extractor module 350 of the local audio output device may receive a signal from the remote audio output device indicating the detection of speech from the remote talker to enable the feature extractor module 350 to estimate the acoustic parameters of the far-field speech signal.

A far-field dominance estimation module 355 may process the far-field speech signal to estimate its energy distribution and the change in the energy distribution such as by estimating the spatial covariance matrix and the variance in time of the spatial covariance matrix. The far-field dominance estimation module 355 may measure whether the energy of the far-field speech signal is dominated by compact sources, such as when the remote talker has a clear acoustic signature, or diffuse energy, such as when the remote talker is too far to have a meaningful acoustic signature.

A far-field direction of arrival and localization module 356 may process the far-field speech signal to estimate its direction of arrival and the change in the direction of arrival. In one aspect, the microphone array 340 may have directional sensitivity to enable the far-field direction of arrival and localization module 356 to estimate the direction of arrival of the far-field speech signal. In one aspect, the direction of arrival of the far-field speech signal from the local talker estimated by the remote audio output device may be used as an aid by the local audio output device to estimate the direction of arrival of the far-field speech signal of the remote talker based on the reciprocity of the spatial relationship between the two audio output devices.

A far-field speech intelligibility index module 357 may process the far-field speech signal to estimate the intelligibility parameter and the change in the intelligibility parameter of the far-field speech. In one aspect, the far-field speech intelligibility index module 357 may apply a machine learning approach such as using a CNN, RNN, etc.

Referring back to FIG. 3, a classifier and parameter estimator module 360 may analyze the estimated acoustic parameters to determine the best communication mode of the local and remote audio output devices for use by the local and the remote talkers to converse with one another. In one aspect, the best communication mode may be a function of the intelligibility, directionality, DRR, energy distribution, etc., of the far-field speech signal.

If the analysis of the acoustic parameters by the classifier and parameter estimator module 360 indicates that the current communication mode may no longer support the conversation between the local and remote talkers, the classifier and parameter estimator module 360 may request the local audio output device to switch to a different communication mode. For example, when the signals captured by the microphone array 340 can no longer support the acoustic communication between the local and remote talkers in the transparency mode due to increasing distance or due to a noise source, the local audio output device may augment the acoustic signal in the transparency mode with the far-field speech signal received through the direct low-latency RF link of the peer-to-peer mode. The classifier and parameter estimator module 360 may estimate the required level and direction metadata for re-spatializing the far-field speech signal received through the RF link based on the extracted acoustic parameters. The far-field speech signal received through the RF link may be re-spatialized to be coherent with the spatial position of the remote speaker so that the acoustic signal may be augmented in a seamless manner.

In one aspect, the communication mode used on both the local and remote audio output devices may be the same. The local audio output device may synchronize the switching of the communication mode with the remote audio output device. In one aspect, the communication mode used on the local and remote audio output devices may be different. This asymmetric mode may arise when a localized noise or interference source is affecting only the local or the remote audio output device.

Figure 5:
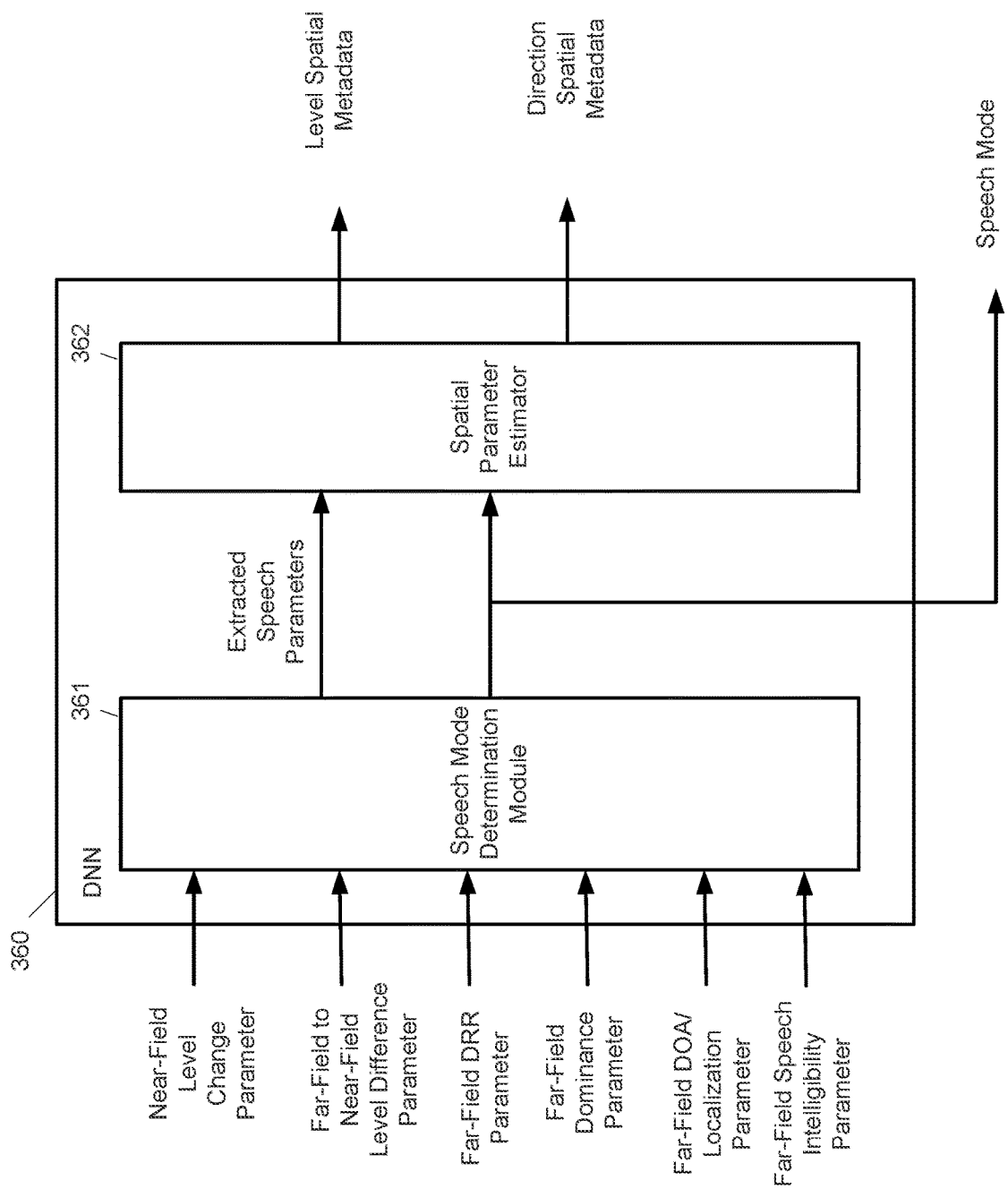
FIG. 5 depicts a functional block diagram of a classifier and parameter estimator module that processes the estimated parameters to determine the communication mode and the spatialization metadata used to re-spatialize the far-end speech signal received in the peer-to-peer mode according to one aspect of the disclosure.

FIG. 5 depicts a functional block diagram of the classifier and parameter estimator module 360 that processes the estimated parameters to determine the communication mode and the spatialization metadata used to re-spatialize the far-end speech signal received in the peer-to-peer mode according to one aspect of the disclosure.

A speech mode determination module 361 may process the estimated acoustic parameters such as the near-field level change parameter, the far-field to near-field level difference parameter, the far-field DRR parameter, the far-field dominance parameter, the far-field direction of arrival and localization parameter, the far-field speech intelligibility parameter, etc., to determine the best communication mode. In one aspect, the speech mode determination module 361 may determine a composite intelligibility index of the far-field speech signal from the estimated acoustic parameters. If the composite intelligibility index is above a first threshold, the speech mode determination module 361 may determine the best communication mode is the transparency mode. If the composite intelligibility index drops below the first threshold but is above a second threshold, the speech mode determination module 361 may determine the best communication mode is to augment the acoustic signal of the transparency mode with the far-field speech signal received through the direct RF link. If the composite intelligibility index drops below the second threshold, the speech mode determination module 361 may determine the best communication mode is the telephony mode.

To augment the acoustic signal in the transparency mode with the far-field speech signal received through the direct low-latency RF, a spatial parameter estimator 362 may estimate spatialization metadata to be applied to the far-field speech signal received through the direct low-latency RF. For example, the speech mode determination module 361 may provide the far-field to near-field level difference parameter, the far-field direction of arrival and localization parameter, the far-field speech intelligibility parameter, etc., to the spatial parameter estimator 362 for the spatial parameter estimator 362 to generate spatialization metadata of the remote talker such as the level spatial metadata and the direction spatial metadata.

Referring back to FIG. 3, a spatial filter 370 may re-spatialize the far-field speech signal received through the direct RF link using the spatialization metadata to have a level and a perceived direction of arrival that mimic spatially the remote talker. The spatial filter 370 may also generate PSD of the spatialized far-field speech signal to be used to equalize the far-field speech signal received through the telephony mode when switching the communication mode to the telephony mode.

Figure 6:
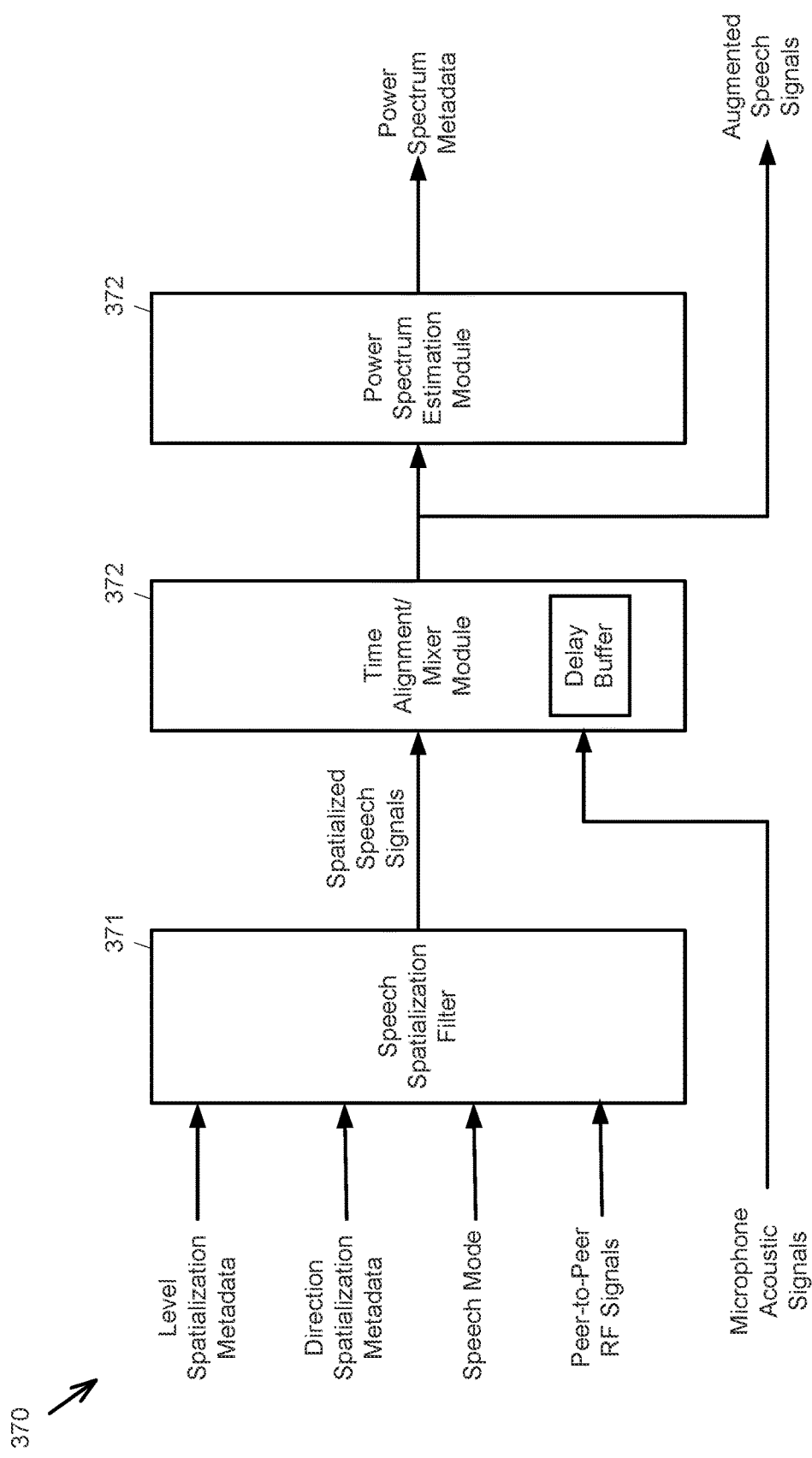
FIG. 6 depicts a functional block diagram of a spatial filter module that re-spatializes the far-end speech signal received in the peer-to-peer mode using spatialization metadata and generates power spectrum metadata used to equalize the far-end speech signal received in the telephony mode according to one aspect of the disclosure.

FIG. 6 depicts a functional block diagram of the spatial filter module 370 that re-spatializes the far-end speech signal received in the peer-to-peer mode using spatialization metadata and generates power spectrum metadata used to equalize the far-end speech signal received in the telephony mode according to one aspect of the disclosure.

A speech spatialization filter 371 applies the level spatialization metadata and the direction spatialization metadata generated by the classifier and parameter estimator module 360 to the far-end speech signal received from the direct RF link in the peer-to-peer mode to generate the spatialized speech signal. The spatialized far-field speech signal from the direct RF link may be used to augment the far-field speech signal received acoustically by the microphone array 340 in the transparency mode. In one aspect, the speech spatialization filter 371 may add the far-field speech signal received from the microphones with the spatialized far-field speech signal from the RF link to improve the SNR of the augmented far-field speech in the transparency or the peer-to-peer mode.

A time alignment/mixer module 372 may time-align and mix the far-field speech signal from the microphone array 340 with the spatialized far-field speech signal from the direct RF link to generate the augmented far-field speech signal. In one aspect, if the far-field speech signal from the microphone array 340 has a shorter latency than the spatialized far-field speech signal from the direct RF link due to long processing latency of the speech spatialization filter 371, frames of the far-field speech signal from the microphone array 340 may be delayed by a delay buffer to time-align with the frames of the spatialized far-field speech signal. In one aspect, if the spatialized far-field speech signal from the direct RF link has a shorter latency than the far-field speech signal from the microphone array 340, frames of the spatialized far-speech signal may be delayed by a delay buffer to time-align with the frames of the far-field speech signal from the microphone array 340.

A power spectrum estimation module 372 may estimate the running statistics of the PSD of the spatialized far-field speech signal or the augmented far-field speech signal in the transparency mode or in the peer-to-peer mode to generate the power spectrum metadata. The power spectrum metadata may be used to equalize the far-end speech signal received in the telephony mode to have similar power spectrum as the spatialized far-field speech signal or the augmented far-field speech signal to smooth the transition to the telephony mode. In one aspect, the power spectrum estimation module 372 may estimate the running statistics of the PSD of the near-field speech signal in the transparency mode to generate the power spectrum metadata. The power spectrum metadata may be used to equalize the far-end speech signal received in the telephony mode when the communication mode transitions directly from the transparency mode to the telephony mode.

Referring back to FIG. 3, a summing module 380 may equalize the far-end speech signal received in the telephony mode using the power spectrum metadata. The summing module 380 may sum the equalized far-end speech signal in the telephony mode and the spatialized far-field speech signal or the augmented far-field speech signal in the transparency mode or in the peer-to-peer mode to generate the processed far-field speech signal to drive the speaker 390 of the local audio output device. Alternatively, in the transparency mode or in the peer-to-peer mode, the acoustic signal from the microphone array 340, the spatialized far-field speech signal, or the augmented far-field speech signal may be driven to the speaker 390.

Figure 7:
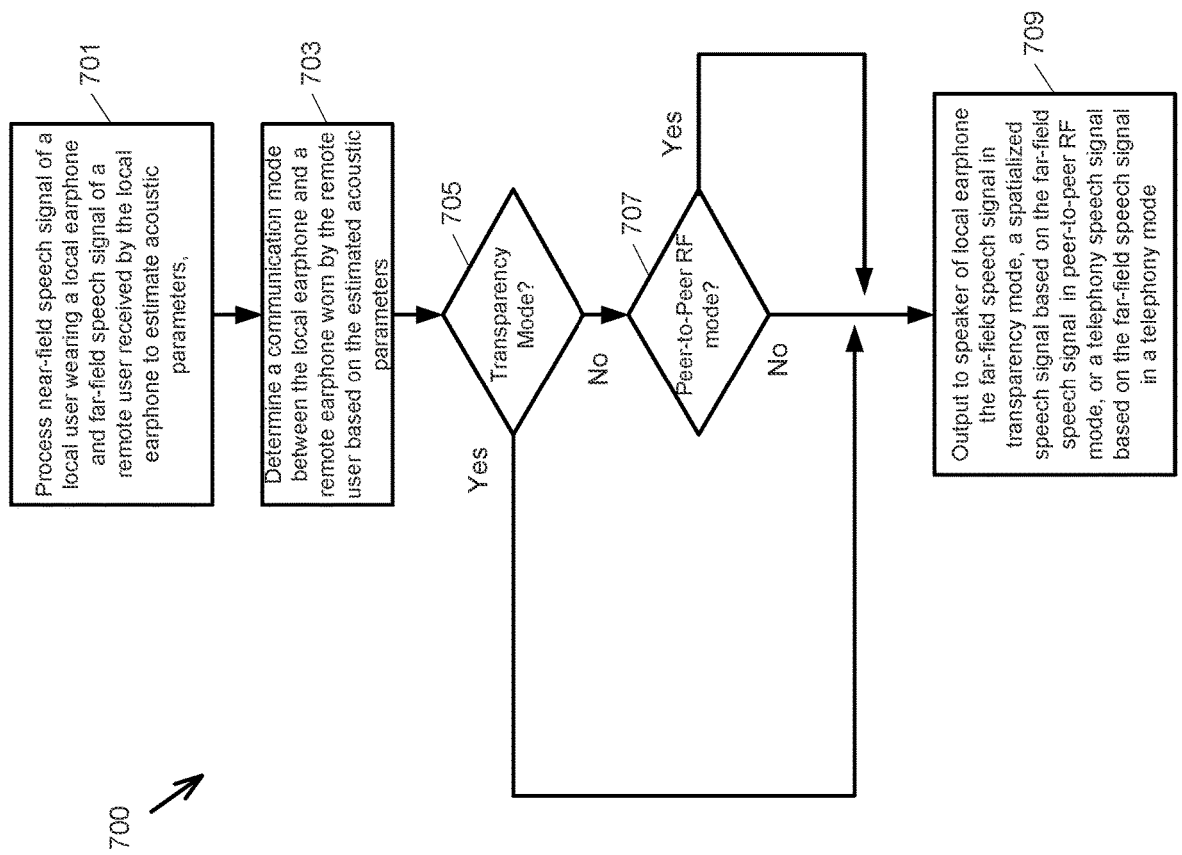
FIG. 7 is a flow diagram of a method for determining the communication mode and for transitioning between the communication modes of a wearable audio output device based solely on acoustic analysis according to one aspect of the disclosure.

FIG. 7 is a flow diagram of a method 700 for determining the communication mode and for transitioning between the communication modes of a wearable audio output device such as an earphone based solely on acoustic analysis according to one aspect of the disclosure. Method 700 may be practiced by the system 300 of FIG. 3.

In operation 701, the method 700 processes a near-field speech signal and a far-field speech signal received by a local earphone to estimate the acoustic parameters of the acoustic environment. The near-field speech signal is received from a local user of the local earphone and the far-field speech signal is received from a remote user of a remote earphone.

In operation 703, the method 700 processes the estimated acoustic parameters to determine a communication mode between the local earphone and the remote earphone. The communication mode includes an acoustic transparency mode, a peer-to-peer RF mode, or a telephony mode.

In operation 705, the method 700 determines if the communication mode is the transparency mode. If it is the transparency mode, operation 709 outputs the far-field speech signal to the local user of the local earphone.

If the communication mode is not the transparency mode, operation 707 determines if the communication mode is the RF peer-to-peer mode. If it is the RF peer-to-peer mode, operation 709 outputs a spatialized speech signal based on the far-field speech signal to the local earphone. In one aspect, the method 700 may process the far-field speech signal received in the RF peer-to-peer mode to generate the spatialized speech signal based on a perceived direction of the remote user determined from the estimated acoustic parameters.

Otherwise, if the communication mode is not the transparency mode nor the RF peer-to-peer mode, operation 709 outputs a telephony speech signal based on the far-field speech signal to the local earphone.

Figure 8:
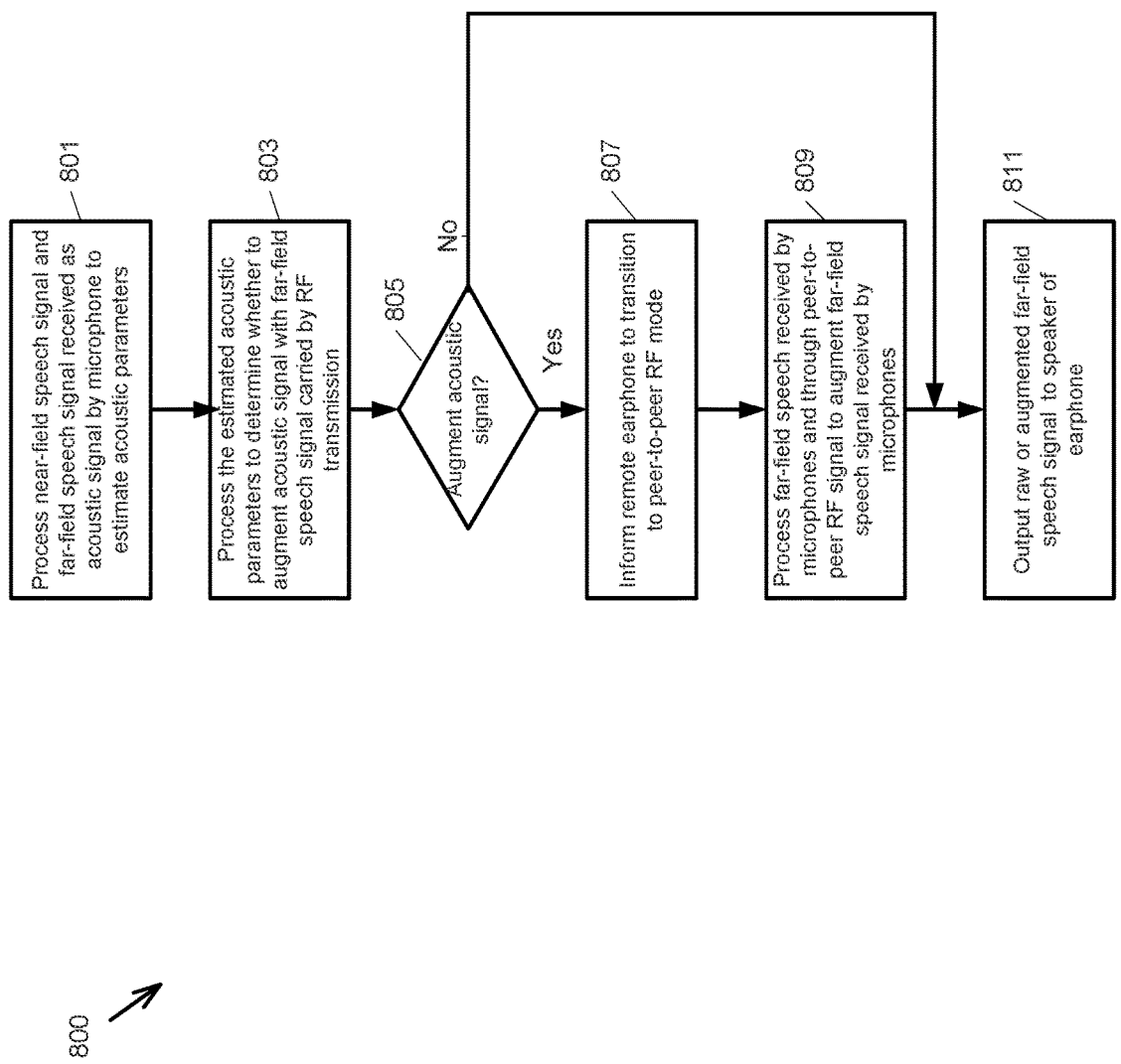
FIG. 8 is a flow diagram of a method for augmenting the acoustic signal of the far-field speech captured by a microphone of a wearable audio output device with the far-field speech signal carried on an RF transmission based solely on acoustic analysis according to one aspect of the disclosure.

FIG. 8 is a flow diagram of a method 800 for augmenting the acoustic signal of the far-field speech captured by a microphone of a wearable audio output device such as an earphone with the far-field speech signal carried on an RF transmission based solely on acoustic analysis according to one aspect of the disclosure. Method 800 may be practiced by the system 300 of FIG. 3.

In operation 801, the method 800 processes the near-field speech signal and the far-field speech signal received as acoustic signals by the microphone to estimate the acoustic parameters of the acoustic environment.

In operation 803, the method 800 processes the estimated acoustic parameters to determine whether to augment the acoustic signal with far-field speech signal carried by RF transmission.

In operation 805, the method 800 checks if the decision is to augment the acoustic signal. If there is no augmentation, operation 811 outputs the raw far-field speech signal to the speaker of the earphone.

If the decision is to augment the acoustic signal, in operation 807, the method informs the remote earphone to transition to the peer-to-peer mode.

In operation 809, the method 800 processes the far-field speech signal received by the microphone and through the peer-to-peer RF signal to augment the far-field speech signal received by the microphone.

In operation 811, the method 800 outputs the augmented far-field speech signal to the speaker of the earphone.

Embodiments of the stereo signal identifier or audio signal identifier described herein may be implemented in a data processing system, for example, by a network computer, network server, tablet computer, smartphone, laptop computer, desktop computer, other consumer electronic devices or other data processing systems. In particular, the operations described for determining the best communication mode for use by a wearable audio output device are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

As described above, one aspect of the present technology is the transmission and use of speech or data from specific and legitimate sources to an audio output device using different communication modes. The present disclosure contemplates that in some instances, this speech or data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers the transmission of use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method of communicating between a local earphone and a remote earphone, the method comprising:
    processing, by the local earphone, a near-field speech signal of a local talker wearing the local earphone and a far-field speech signal of a remote talker received by the local earphone to estimate acoustic parameters;

determining a communication mode between the local earphone and the remote earphone worn by the remote talker based on the estimated acoustic parameters, the communication mode including one of an acoustic transparency mode that captures the far-field speech signal by a microphone of the local earphone, a peer-to-peer radio-frequency (RF) mode, or a telephony mode, the peer-to-peer RF mode or the telephony mode communicating using RF signals between local earphone and the remote earphone; and outputting, to a speaker of the local earphone, the far-field speech signal in the acoustic transparency mode, an augmented speech signal based on the far-field speech signal in the peer-to-peer RF mode, or a telephony speech signal based on the far-field speech signal in the telephony mode.

2. The method of claim 1, wherein the microphone comprises an array of microphones.

3. The method of claim 1, wherein determining the communication mode comprises:

generating an intelligibility index of an acoustic signal carrying the far-field speech signal that is captured by a microphone of the local earphone based on the estimated acoustic parameters;

determining whether the intelligibility index exceeds a first intelligibility threshold;

responsive to the intelligibility index exceeding the first intelligibility threshold, determining the acoustic transparency mode as the communication mode; and outputting the acoustic signal carrying the far-field speech signal to the speaker of the local earphone in the acoustic transparency mode.

4. The method of claim 3, further comprising:

responsive to the intelligibility index not exceeding the first intelligibility threshold, determining whether the intelligibility index exceeds a second intelligibility threshold;

responsive to the intelligibility index exceeding the second intelligibility threshold, determining the peer-to-peer RF mode as the communication mode, wherein in the peer-to-peer RF mode the local earphone receives an RF signal carrying the far-field speech signal through a peer-to-peer RF link with the remote earphone; and responsive to the intelligibility index not exceeding the second intelligibility threshold, determining the telephony mode as the communication mode, wherein in the telephony mode the local earphone receives an RF signal carrying the far-field speech signal through a network link with the remote earphone.

5. The method of claim 4, further comprising:

generating the augmented speech signal based on augmenting the acoustic signal carrying the far-field speech signal with the RF signal carrying the far-field speech signal when the peer-to-peer RF mode is determined as the communication mode.

6. The method of claim 5, wherein generating the augmented speech signal comprises:

generating spatialization metadata of the remote talker using the estimated acoustic parameters;

generating a spatialized far-field speech signal having a level and a direction of arrival that mimic spatially the remote talker based on the far-field speech signal carried by the RF signal and the spatialization metadata; and generating the augmented speech signal based on augmenting the acoustic signal carrying the far-field speech signal with the spatialized far-field speech signal to increase a signal-to-noise ratio (SNR) of the far-field speech signal.

7. The method of claim 6, wherein the spatialized far-field speech signal is spatially coherent with the acoustic signal carrying the far-field speech signal, and wherein the method further comprises:

generating the augmented speech signal based on aligning the acoustic signal in time with the spatialized far-field speech signal.

8. The method of claim 1, further comprising:

estimating a power spectrum of the far-field speech signal; and generating the telephony speech signal equalized with the power spectrum of the far-field speech signal when the telephony mode is determined as the communication mode.

9. The method of claim 1, wherein processing the near-field speech signal of the local talker and the far-field speech signal of the remote talker comprises:

processing an RF signal received by the local earphone from the remote earphone to estimate the acoustic parameters, wherein the RF signal contains information on a reciprocal far-field speech signal of the local talker received acoustically by the remote earphone.

10. The method of claim 9, wherein the information on the reciprocal far-field speech signal comprises reciprocal acoustic parameters estimated by the remote earphone.

11. The method of claim 1, further comprising:

transmitting, by the local earphone, the estimated acoustic parameters to the remote earphone to aid the remote earphone in determining the communication mode between the local earphone and the remote earphone.

12. The method of claim 1, wherein the estimated acoustic parameters comprise one or more of:

a speech level difference between the near-field speech signal and the far-field speech signal or a rate of change of the speech level difference;

a direct-to-reverberant ratio (DRR) of a speech level of a direct component and a reverberant component of the far-field speech signal;

a rate of change of the DRR;

a measure of energy distribution of the far-field speech signal;

a rate of change of the measure of energy distribution;

a change in a speech level of the near-field speech signal;

a rate of change in the speech level of the near-field speech signal;

an estimated direction of arrival of the far-field speech signal;

a rate of change of the estimated direction of arrival;

a measure of intelligibility of the far-field speech signal; and a rate of change of the measure of intelligibility.

13. A processor of an earphone, the processor configured to perform operations comprising:

process a near-field speech signal of a local talker wearing the earphone and a far-field speech signal of a remote talker received by the earphone to estimate acoustic parameters;

determine a communication mode between the earphone and a remote earphone worn by the remote talker based on the estimated acoustic parameters, wherein the communication mode includes one of an acoustic transparency mode that captures the far-field speech signal by a microphone of the earphone, a peer-to-peer radio-frequency (RF) mode, or a telephony mode, the peerto-peer RF mode or the telephony mode being configured to communicate using RF signals between local earphone and the remote earphone; and output to a speaker of the earphone the far-field speech signal in the acoustic transparency mode, an augmented speech signal based on the far-field speech signal in the peer-to-peer RF mode, or a telephony speech signal based on the far-field speech signal in the telephony mode.

14. The processor of claim 13, wherein the operations to determine the communication mode comprises operations to:

generate an intelligibility index of an acoustic signal carrying the far-field speech signal that is captured by a microphone of the earphone based on the estimated acoustic parameters;

determine whether the intelligibility index exceeds a first intelligibility threshold;

responsive to the intelligibility index exceeding the first intelligibility threshold, determine the acoustic transparency mode as the communication mode;

output the acoustic signal carrying the far-field speech signal to the speaker of the earphone in the acoustic transparency mode;

responsive to the intelligibility index not exceeding the first intelligibility threshold, determining whether the intelligibility index exceeds a second intelligibility threshold;

responsive to the intelligibility index exceeding the second intelligibility threshold, determine the peer-to-peer RF mode as the communication mode, wherein in the peer-to-peer RF mode the earphone receives an RF signal carrying the far-field speech signal through a peer-to-peer RF link with the remote earphone; and responsive to the intelligibility index not exceeding the second intelligibility threshold, determine the telephony mode as the communication mode, wherein in the telephony mode the earphone receives an RF signal carrying the far-field speech signal through a network link with the remote earphone.

15. The processor of claim 14, wherein the operations further comprise:

generate the augmented speech signal based on augmenting the acoustic signal carrying the far-field speech signal with the RF signal carrying the far-field speech signal to increase a signal-to-noise ratio (SNR) of the far-field speech signal when the peer-to-peer RF mode is determined as the communication mode, wherein the augmented speech signal is spatially coherent and time aligned with the acoustic signal.

16. The processor of claim 13, wherein the operations to process the near-field speech signal of the local talker and the far-field speech signal of the remote talker comprises operations to:

process an RF signal received by the earphone from the remote earphone to estimate the acoustic parameters, wherein the RF signal contains reciprocal acoustic parameters estimated by the remote earphone on a reciprocal far-field speech signal of the local talker received acoustically by the remote earphone.

* * * * *